United States Patent
Elder et al.

(10) Patent No.: US 7,292,943 B2
(45) Date of Patent: Nov. 6, 2007

(54) SYSTEM AND METHOD FOR CONTROL OF SEISMIC DATA ACQUISITION

(75) Inventors: Alfred K. Elder, Richmond, TX (US); Robert C. Moore, Sugar Land, TX (US); Byron Cain, Houston, TX (US)

(73) Assignee: Input/Output, Inc., Houston, TX (US)

( * ) Notice: Subject to any disclaimer, the term of this patent is extended or adjusted under 35 U.S.C. 154(b) by 0 days.

(21) Appl. No.: 10/360,313

(22) Filed: Feb. 7, 2003

(65) Prior Publication Data

US 2004/0008175 A1    Jan. 15, 2004

Related U.S. Application Data (60) Provisional application No. 60/355,447, filed on Feb. 7, 2002, provisional application No. 60/355,272, filed on Feb. 7, 2002, provisional application No. 60/355,373, filed on Feb. 7, 2002.

(51) Int. Cl.
*G01V 1/28* (2006.01)
*G06F 19/00* (2006.01)

(52) U.S. Cl. ............................................. 702/14; 703/5
(58) Field of Classification Search ................. 702/14, 702/188, 7–13, 15–16; 324/331; 367/23, 367/68, 75, 76–79, 143; 703/5
See application file for complete search history.

(56) References Cited

U.S. PATENT DOCUMENTS

| 3,378,096 | A | * | 4/1968 | Cherry, Jr. | 367/75 |
|---|---|---|---|---|---|
| 3,406,777 | A | * | 10/1968 | Bemrose | 367/23 |
| 3,409,870 | A | * | 11/1968 | Mounce et al. | 367/68 |
| 4,814,711 | A | * | 3/1989 | Olsen et al. | 324/331 |
| 5,253,219 | A | | 10/1993 | Houston et al. | 367/79 |
| 5,600,318 | A | | 2/1997 | Li | 341/143 |
| 5,822,273 | A | | 10/1998 | Bary et al. | 367/77 |
| 5,920,828 | A | * | 7/1999 | Norris et al. | 702/14 |
| 6,560,565 | B2 | * | 5/2003 | Roy et al. | 702/188 |

\* cited by examiner

*Primary Examiner*—John Barlow
*Assistant Examiner*—Victor J. Taylor
(74) *Attorney, Agent, or Firm*—Madan, Mossman & Sriram, P.C.

(57) ABSTRACT

The present invention provides an interactive system for controlling seismic data acquisition. A central controller controls seismic sources, detectors and receivers. A user/operator is provided one or more views of the operational components over a graphical user interface and is provided software to change parameters associated with the components. A second controller might be located in a seismic source vehicle. There exists two-way data and audio communication between the two controllers for providing dual control of the system. A field operator, relays information to and receives information from the central operator and controller. Together, the operators make decisions for selecting and operating system components.

19 Claims, 6 Drawing Sheets

SYSTEM AND METHOD FOR CONTROL OF SEISMIC DATA ACQUISITION

CROSS-REFERENCES TO RELATED APPLICATIONS

This application claims priority from U.S. Provisional Patent Applications No. 60/355,447 filed Feb. 7, 2002; No. 60/355,272 filed Feb. 7, 2002; and No. 60/355,373 filed Feb. 7, 2002. The entire contents of each above-referenced applications is hereby incorporated herein by reference.

BACKGROUND OF THE INVENTION

1. Field of the Invention

This invention relates generally geologic surveys and more particularly to a system and method for acquiring and processing seismic data.

2. Description of the Related Art

Conventional geophone, accelerometer and hydrophone systems used in seismic prospecting typically have several sensors that produce signals indicative of a seismic wave. The seismic wave is usually produced by an energy source such as a vibrator truck, explosives or by an air gun in the case of a hydrophone system. These seismic signals are then conducted to acquisition/conversion circuitry. The analog signals from one or more remote seismic sensors (hydrophones, geophones, or other seismic sensors) are sampled and converted to a series of digital values by the acquisition/conversion circuitry. The acquisition/conversion circuitry is typically configurable to, for example, adjust the sampling rate, alter any digital filtering or other digital signal processing parameters, or perform diagnostics.

One or more of these acquisition/conversion circuits are connected to a data collection unit. Each data collection unit collects the series of digital values for all the seismic sensors connected to all the acquisition/conversion units connected to it. The data collection unit passes that data to a system controller, which may include a seismic recording device.

Problems encountered using a conventional system include low efficiency caused by the collection of degraded or corrupted data. The collection of such data is the inability of an operator to understand large system (spread) effects of using particular components. The operator is unable to make decisions based on real-time events.

Another drawback of the conventional system is low productivity, meaning that data acquisition over a period of time is not continuous. System component failures and obstacles presented in the field usually require operations to halt for a recovery to occur. To choose an alternate path after a failure or after encountering an obstacle such as a previously unknown body or water, cliff or dense foliage causes an unacceptable loss of data acquisition.

The typical system also suffers from an inability to customize or otherwise fine-tune system parameters in the field without substantial effort. The operator either must reconfigure multiple parameters or have software changes made by component experts.

Therefore, a need exists to have a seismic survey system capable if real-time configuration changes in the field. A need exists to provide an operator a quick and efficient method to enter and/or change parameters relating to system components. A need also exists for easy determination of tasks performed by various system components and for task organization. Additionally, drawbacks in the conventional system create a need for enhanced communication and commanding between the central controller, field sensors, receivers, data units, and seismic source controllers.

SUMMARY OF THE INVENTION

The present invention addresses the above-identified problems found in the conventional seismic data acquisition system by providing a system having a plurality of field units including one or more seismic sources, one or more seismic sensors for receiving acoustic energy generated by the sources and reflected within an underground formation, a data acquisition unit, a receiver/transmitter, and a central controller processor remotely located from one or more field units.

The present invention provides an operator/user workstation located with the central controller, wherein a user can control some or all of the seismic data acquisition operations remotely from the central controller. The operator uses a user interface of the present invention and computer software according to the present invention to conduct a seismic survey operation.

The present invention provides method of conducting a seismic survey. The method includes selecting at least one seismic source characteristic such as source, source location, source state, source type, source availability and grade, and the like. The selected parameters are used to determine one or more effects on the entire seismic survey plan if a source having the selected characteristics is activated. The user may then select a course of action in the conduct of the seismic data acquisition to increase overall productivity and/or efficiency of the operation. Thus, time and money are both saved using the present invention.

In another aspect of the invention a computer-readable medium containing useful instructions embodied as a software program. The computer-readable medium includes computer-executable instructions for performing a method of seismic survey. The instructions enable a computer-based system to perform selection of one or more characteristics of a seismic source, determining one or more survey plan effects using the selected seismic source parameters, and providing a user the system effects over an output device. The user may adjust, or fine tune, the system from a central controller housing the computer system. Adjustments may be made by determining future action during real-time seismic acquisition and without a cessation of operations.

The present invention also provides a user interface for a computer system for use in a seismic survey. The computer system preferably has a user interface including an output device and a selection device, and the interface enables a method of providing and selecting seismic survey parameters from an output on the output device. The method comprises providing an output of available seismic survey components so the user can select a survey component from the available components. The user interface then provides an output indicating available user-input parameters relevant to the selected seismic component. The user can then enter user-defined parameters for the selected seismic component from the available user-input parameters. The method includes determining one or more system effects using the selected seismic component and user-defined parameters, and provides an output of the system effects.

BRIEF DESCRIPTION OF THE DRAWINGS

The novel features of this invention, as well as the invention itself, will be best understood from the attached drawings, taken along with the following description, in which similar reference characters refer to similar parts, and in which.

DETAILED DESCRIPTION OF THE INVENTION

Figures 1A, 1B:
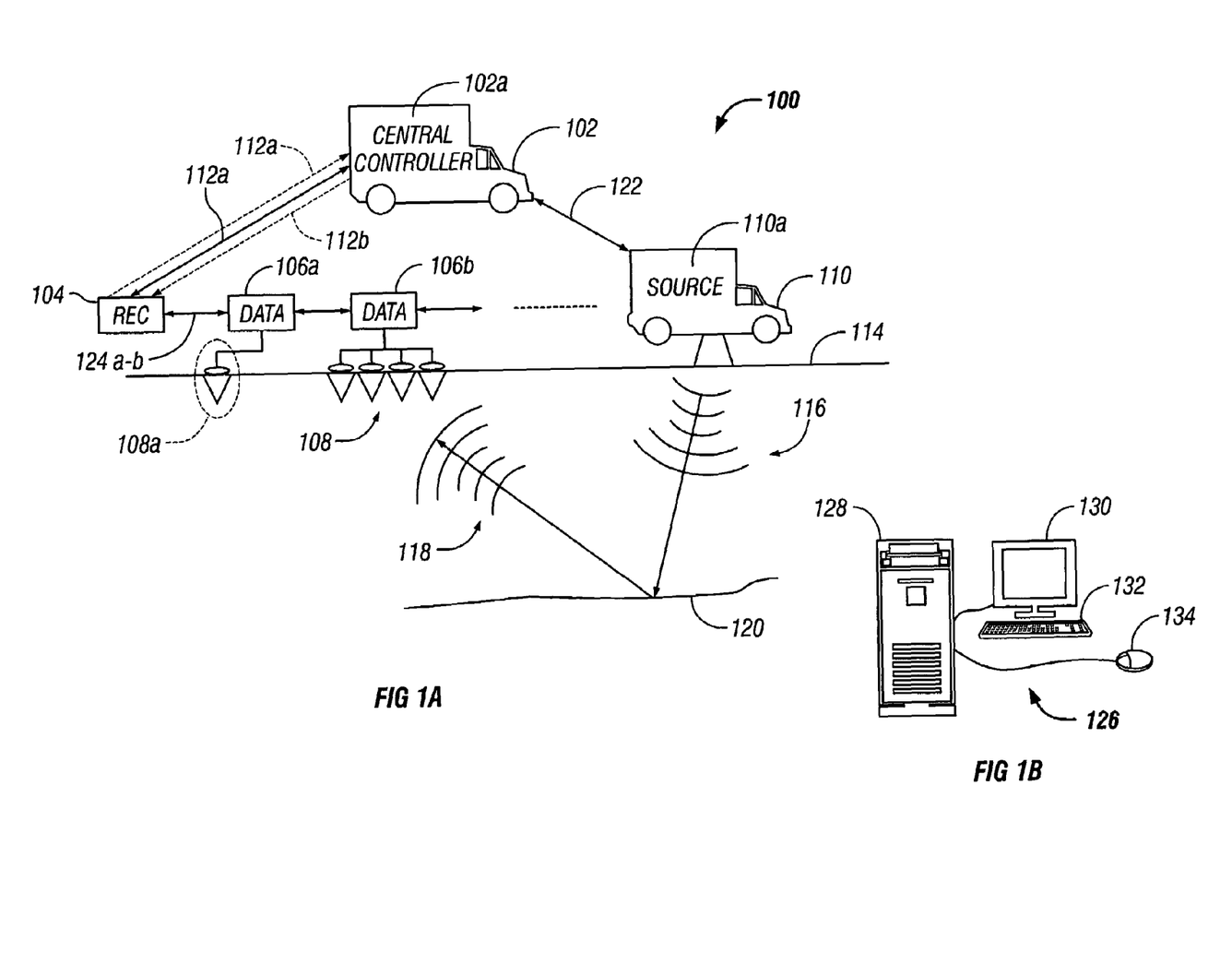
FIG. 1A is a system schematic of one embodiment of a seismic data acquisition system according to the present invention.
FIG. 1B is a workstation including a GUI according to the present invention and processors for use as a central controller and/or a remotely located controller at a seismic source.

FIG. 1 is a system schematic of one embodiment of a seismic surveying system according to the present invention. The system 100 includes a primary control and recording unit 102 for delivering commands to and receiving data signals from one or more remote units in the system 100. As shown, the primary control and recording unit 102 is a mobile unit known by those skilled in the art as a "truck" or "dog house". Alternatively, the primary control and recording unit may be housed in any vehicle or carrier, or may be semi-permanently installed at a predetermined location.

The primary control and recording unit 102 (also referred to hereinafter as the central controller 102) is coupled to one or more receiver units 104. The receiver units may be collocated with the central controller 102 or the units 104 may be located in the field e.g. in the spread. The receivers 104 are linked via a two-way communication link 124 to a plurality of data acquisition units ("DAUs") 106a-106b, etc . . . . The data acquisition units 106 include circuitry for receiving signals from an array 108 of seismic sensors 108a. Each seismic sensor preferably provides a digital output signal indicative of sensed seismic activity. In an alternative embodiment, the sensor output signal is analog, with A/D conversion being performed within a DAU.

The system 100 further includes a seismic source 110 such as crew of one or more vibrator trucks, explosives (e.g. dynamite), air guns, or the like. The source 110 and central controller 102 are linked via a two-way communication link 122. The communication link 122 may be analog or digital, and data so communicated preferably includes control settings, shot commands, location (relative and/or global) status information, source availability, source grade, and any other information useful in managing the survey. Details of these various data will be described in greater along with several embodiments.

In one embodiment, the source 110 includes a global positioning system ("GPS") to provide highly accurate location information to the central controller 102. These GPS units are well known and are available as off-the-shelf modules. Thus, the GPS is not described in detail here. The present invention also contemplates and includes in several embodiments, GPS units in any or all of the remote components, namely the receiver 104, and the data acquisition units 106a-b. In this manner accurate location information for the entire spread can be used in managing the survey operation from the central controller.

In operation, the source 110 imparts acoustic energy into the surface 114 of the earth, thereby setting up an acoustic wave 116 radiating generally downward into the earth. The acoustic wave 116 will partially reflect at an impedance change such as a formation boundary 120, thus producing a reflected wave 118 that travels generally back toward the surface 114.

The reflected wave 118 is detected at the detector array 108 by the individual sensors 108a. The sensors may be any number of sensors adapted to detect acoustic energy, such as a geophone, a microphone, an accelerometer-based detector, a hydrophone in the case of wetlands, and the like. Alternatively, the array may be a single element or include many elements. The detectors 108a may provide an analog or digital output signal, and there may be a combination of detectors in an array 108 e.g. a combination of detector types and/or output signals just described.

The output signals from an array 108 may comprise signals from the individual detectors 108a or may comprise one signal per detector. In one embodiment, the signal(s) are preprocessed using a processor (not separately shown) within each data acquisition unit 106a-106b. However, the signals may be processed at any suitable location using well-known signal processing techniques. Preprocessing may include various known signal-processing techniques such as filtering and packaging. The data are then transmitted to the receiver 104. The receiver 104 is shown as a single receiver for simplicity. Those skilled in the art would readily understand that any number of receivers might be deployed in practice to receive data from sensor arrays 108.

In one embodiment, couplings 112 between the central controller 102 and the receiver 104, couplings 124 between the receiver 104 and DAUs 106, and between each DAU and sensor array 108, and couplings 122 between the central controller 102 and the source 110, are electrically conductive wires 112a and 112b, 122a, 122b, 124a, 124b. These couplings are referred to collectively as couplings 112/124, and when otherwise required an individual coupling will be discussed using a respective reference numeral. The wires comprising the couplings 112/124 are selected to adequately transfer electrical power and data as required by a particular application. Alternatively, the couplings 112/124 may be any suitable coupling capable of transferring electrical-power and data signals. It is not necessary that one coupling, for example coupling 112a, be the same coupling type as any other the other coupling, say 112b, along the complete signal path. Exemplary couplings may be any combination of wire, radio frequency, optical fiber, or electromagnetic. Alternatively and where power is otherwise provided to any particular unit, e.g. a battery in the receiver or a generator as with the source 110, the couplings 112/124 may also include a radio link. In these alternative embodiments, transceivers (combination receiver and transmitter) are installed in the units so linked. Couplings 112/124 between the central controller 102 and the receiver 104 are shown as dashed lines to illustrate this point.

Figure 2:
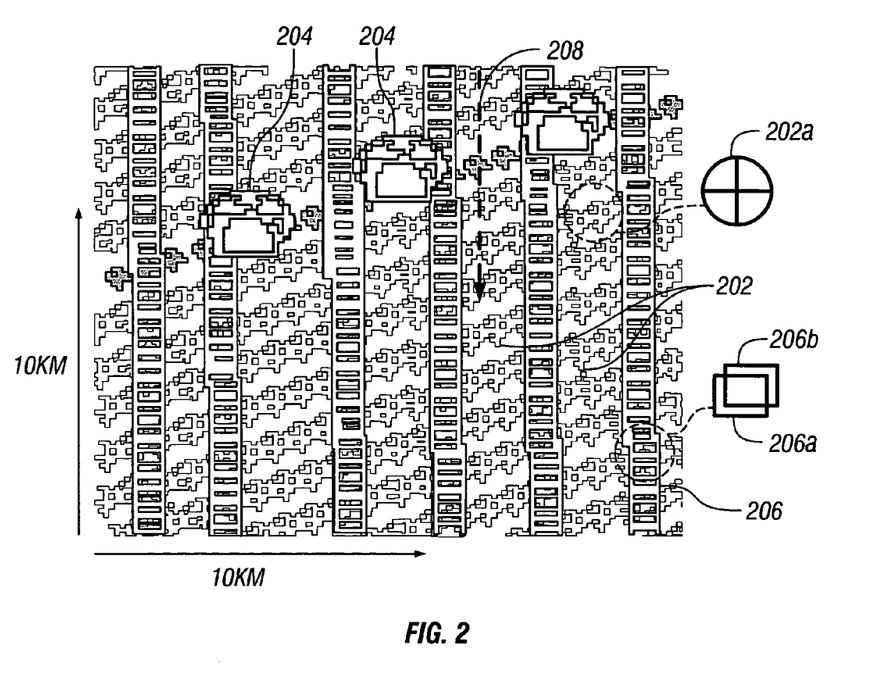
FIG. 2 is a graphical display of a spread portion surveyed by a system as shown in FIG. 1A.

FIG. 2 is an overhead plot of a spread 200 to show various remote field units used in the present invention. Shown is a detail portion of a spread 200 that covers a large surface area, 10 kilometers by 10 kilometers or more for example. The spread includes multiple detectors 202 dispersed in a pattern on the ground. Several receivers 204 are strategically placed in the spread to receive signals from the detectors 202. Also shown are one or more acoustic energy sources 206, either placed in a predetermined location or conveyed from one point to another along a progression path 208. Those skilled in the art would understand that vibrator trucks are driven along the progression path 208 to impart energy into the ground along that path at predetermined locations. Similarly, dynamite charges could be detonated at each location, or air guns could be used for progression paths over water. Large spreads such as the one just described are preferably surveyed using multiple source crews 206a and 206b to efficiently cover the spread and to provide source redundancy.

Figure 3:
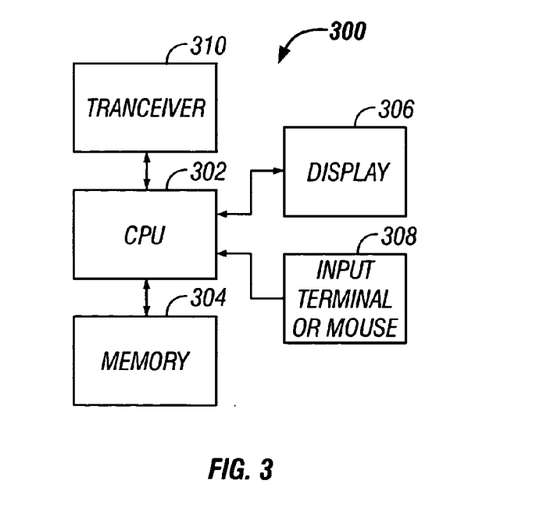
FIG. 3 is a functional block diagram of a central controller such as the controller of FIG. 1A.

FIG. 3 is a functional block diagram of a central controller 300, such as the central controller 102 described above and shown in FIG. 1. The controller 300 includes a central processor 302, one or more storage units ("memory") 304 coupled to the CPU, an input terminal 308 such as a keyboard and/or mouse for allowing user input to the CPU 302, and a display unit 306 that provides the user various views according to the present invention, which will be described later with reference to FIG. 6. The central controller 300 preferably includes a transceiver 310 that preferably includes a transmitter and a receiver for radio communication with field units. A field unit may be a field receiver such as receiver 104 described above and shown in FIG. 1, or a receiver may be included in a single sensor 108a or in a DAU 106. The remote seismic source 110 includes a transceiver substantially identical to the transceiver 310 for two-way communication with the central controller 300.

Referring to FIG. 1A, the central controller 102 is preferably a computer workstation 126 comprising commercial components and modified to be robust in the field environment. Likewise, such a workstation 126 is also located in the source vehicle 110 to be used in remotely controlling the system 100. Shown is a computer 126 to house the components discussed above and shown functionally in FIG. 3. An interactive user interface is provided through an output device such as a display 128 and an input device such as a keyboard 130 and/or mouse 132. The output device can be any other device capable of providing an output and is not limited to the display shown. For example, a dual output might be sent to a magnetic tape, electronic memory or to a paper log.

Figure 4:
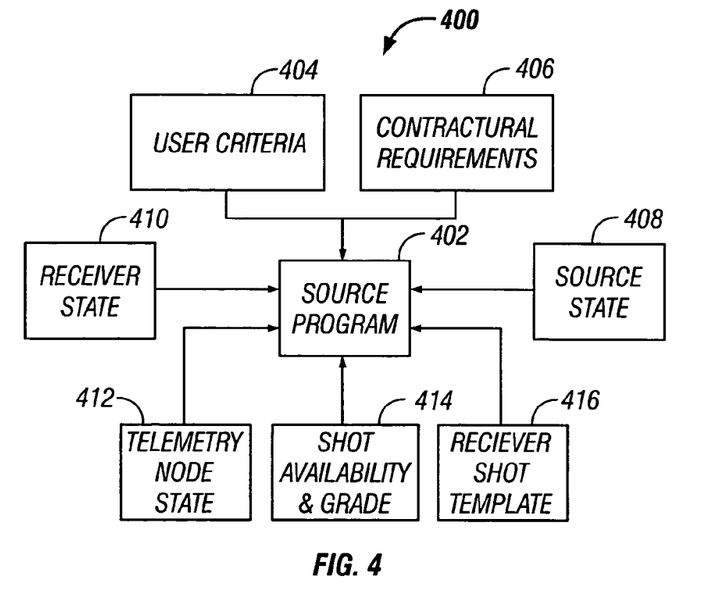
FIG. 4 is a functional block diagram of a computer-executable program according to the present invention.

FIG. 4 is a functional flow 400 of source-domain software 402 according to the present invention. A short background discussion is provided here to help in understanding the concepts of the related embodiments of the present invention.

Seismic acquisition systems may operate in any of three domains, i.e. ground electronic unit domain, seismic source domain, and a receiver sensor domain. Operating in a "domain" means to determine one or more characteristics of the component in which domain the system is to operate. The characteristics might be output signal level, position, location, or any other suitable characteristic. The characteristic can be measured, observed or determined through analytical methods. Control methods utilize one of these domains as a source of relative information (i.e. the characteristic) for determining health, status and other system parameters. Various system parameters are set and/or adjusted manually or automatically to conduct the geologic survey. Conventional acquisition systems use the ground electric unit, or DAU, domain, which generally means that a data unit is in place and operating is the primary constraint for initiating a seismic source energy pulse ("shot").

A major limitation of using the ground electric unit domain is that there is no reliable system architecture in place to provide assurance that sensors are in place and operational. Additionally, the conventional systems and methods do not ensure the source is traveling along a productive path. In other words, the conventional systems and methods suffer from poor productivity and are not efficient in the management of a large spread.

A particularly useful embodiment of the present invention includes software 402 for use with the central and remote component processors (e.g. the source 110 of FIG. 1) to enable spread management using the source domain. As described above, seismic acquisition uses energy released into the ground by a source and recorded by receivers. Effective data acquisition may proceed when a source and all specified receivers are in place and operational as defined by predetermined limits called quality control levels ("QC") levels. Operational efficiencies may be achieved when the combined state of the source generator and associated receiver QC levels are presented to the operator. Software according to the present invention provides the operator at the central controller image and spreadsheet data relating to the effect on the survey plan of attempting a shot using any particular source. Thus, the operator is aware of all conditions useful in efficient data acquisition. Equipment state changes result in updates to the source acquisition state. A "survey plan" as used herein includes all components of a system 100, the spread topography and component actual and planed layout. The term further includes a source planned progression path, the alternate progression paths, the actual location of a source and a planned location for a particular shot.

The operator may adjust the QC levels for the source and receivers. If all conditions are satisfied acquisition may proceed automatically. Preferable, only failed conditions require operator intervention.

In one embodiment, the seismic source includes a processor and telemetry as described above. When the central controller issues a shot command, the source activates and imparts acoustic energy into the earth at presumably predefined levels such as vibration frequency or charge force in the case of dynamite.

Quality control level may be defined to assign a percentage value for determining quality control failures. For example, a receiver may be selected and given a quality control percentage value. During system operation, the receiver is remotely polled from the central controller to determine its actual level. If a returned value is less than the set percentage value, then the selected receiver is assigned a state of failure. The user may then take appropriate actions, e.g. select another receiver, another source or another progression path to continue the operation at increased efficiency and productivity.

The user using a workstation at the central controller can assess each source and the condition of any or all sensors associated with the selected source. The user then may sort the sources based on an overall state of the system and continue operations using the best available source and/or receivers.

The software provides automatic start for sources fully ready, i.e. sources meeting a predetermined overall quality control level that is either preloaded in a data base or adjusted or modified by the user in the central controller.

From the workstation the user may assess source locations by determining locations not yet occupied by a source generator. A next best source analysis is determined by the user and software program to find and graphically display on a monitor the closest source ready for activation to source location. Alternatively, a next best source location analysis includes determining the closest source location to an available source generator. This embodiment is useful as sources are moving from one source location to another source location. At a given source location, sensors may not be ready to receive source signals, but sensors at a second location may be ready. The user simply selects an alternate path to the ready location so that operations can continue without waiting for the non-ready sensors to come on-line. This case occurs often when a sensor crew deploying sensors encounters obstacles in the field.

Different survey environments call for varied parameters used to control system components. Parameters are also affected by contract. Parameters that vary may include how many shots; survey area size; survey location; definition of component operational limits and pass/fail criteria etc.

The present embodiment is particularly useful in large survey areas ("spreads"). The system is a dynamic monitoring and control system. Real-time availability and condition information is provided to a user in the control center "dog-house" using a workstation having input devices such as a keyboard, mouse and the like, as well as a display screen and/or printer. The workstation is preferably a commercially available computer system adapted to control the seismic operation.

The user may set criteria for what is an acceptable and what is not an acceptable or a degraded shot. A shot is a common term used to mean an event caused by system components to impart energy into the earth. Productivity is defined herein as the time of continuous data acquisition referenced to a total operation time available in a period, often expressed as a percentage. Efficiency as referred to herein means a measure of useful or otherwise acceptable data acquired with respect to all data acquired.

To maximize productivity, the a program maintained on a computer-readable medium such as RAM, ROM, diskette, hard drive, CD and the like provides data and instructions used by user to determine most productive source path of progression e.g. the program shows crews along a preplanned path are not ready, but an alternate path is ready. The user may immediately choose second path so data acquisition can continue without interruption. The user can determine that a large percentage of detectors in a preplanned path are not available or failed, so the user can choose another path with available/functional hardware.

The software program and computer workstation provides the user data for determining most efficient source to use for a particular shot, e.g. the program shows an available source, but the source and/or receivers and/or detectors will not provide data within predetermined limits. The user can choose another source with corresponding other receivers and/or detectors.

Previous systems/methods used predetermined operational criteria for the system and components. With the present invention, the user can "tune" the system based on particular survey being conducted. For example, the user may have specific contractual requirements that are more or less stringent than the limits/specifications set by component manufacturer. In previous systems, to customize a survey, component or system parameter required new software from the software or hardware vendor. Now the field survey crew can change the configuration in the field with simple computer-based graphical display and input interface software that filters out parameters not relevant to the selected component being configured.

The workstation display shows that a shot source and all associated detectors and receivers are ready for a shot, i.e. an overall state parameter is assessed for the system and the system meets the parameter. Continuous (dynamic) monitoring and look ahead scenarios is thus provided help determine maximum productivity/efficiency for a survey plan during the survey.

Referring back to FIG. 4, the software 402 includes user interface applications that allow a user to enter parameters. The entry program modules preferably include applications for entering contractual requirements 402, user criteria (e.g. field specific parameters), and receiver state information. The program 402 includes a receiver shot template 416 as a starting point for the user.

The seismic source is selected using the user interface program 402. Source state 408 parameters are entered or uplinked from the field during operation. Uplinked information includes shot availability and grade, and the program 402 includes routines 414 for entering parameters associated with shot availability and grade.

Telemetry information comes from a telemetry node in the field. A telemetry node can be defined as any field unit providing telemetry. This telemetry note information is received by the program using a telemetry node routine 412, and the routine 412 also allows the user to enter parameter settings or modify preset parameters in response to field conditions.

Figure 5:
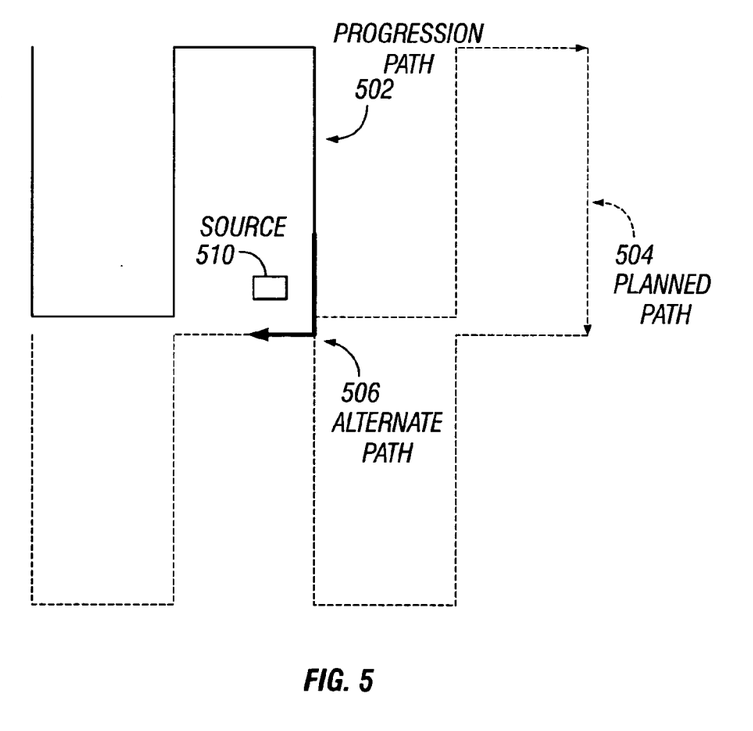
FIG. 5 illustrates a method of choosing an alternate progression path according to the present invention.

FIG. 5 shows schematically a useful method according to the present invention using the workstation control software described above. Shown are a progression path 502, a planned path 504, and an alternate path 506. A source 508 begins a survey along a preplanned path and completes a progression path. The operator at the workstation is able to constantly monitor the progression path 502 and source/receiver locations along the preplanned path 504. Should a problem arise along the preplanned path, the user can immediately command the survey source crew to take the alternate path. Problems may include geologic obstacles, degraded/failed components along the preplanned path, lack of source availability, lack of sensor availability, lack of telemetry node availability. Thus the user can maximize efficiency and productivity by selecting in real-time a path that includes best available source, sensor and telemetry components to ensure reliable data is constantly acquired during a given time period.

The system provides the user at all times information about which sources at any particular source location can be activated. The information provides the level of data comprise to be expected using a path or source selected, as well as a relative level of compromise related to parameters stored in a system memory.

Figure 6:
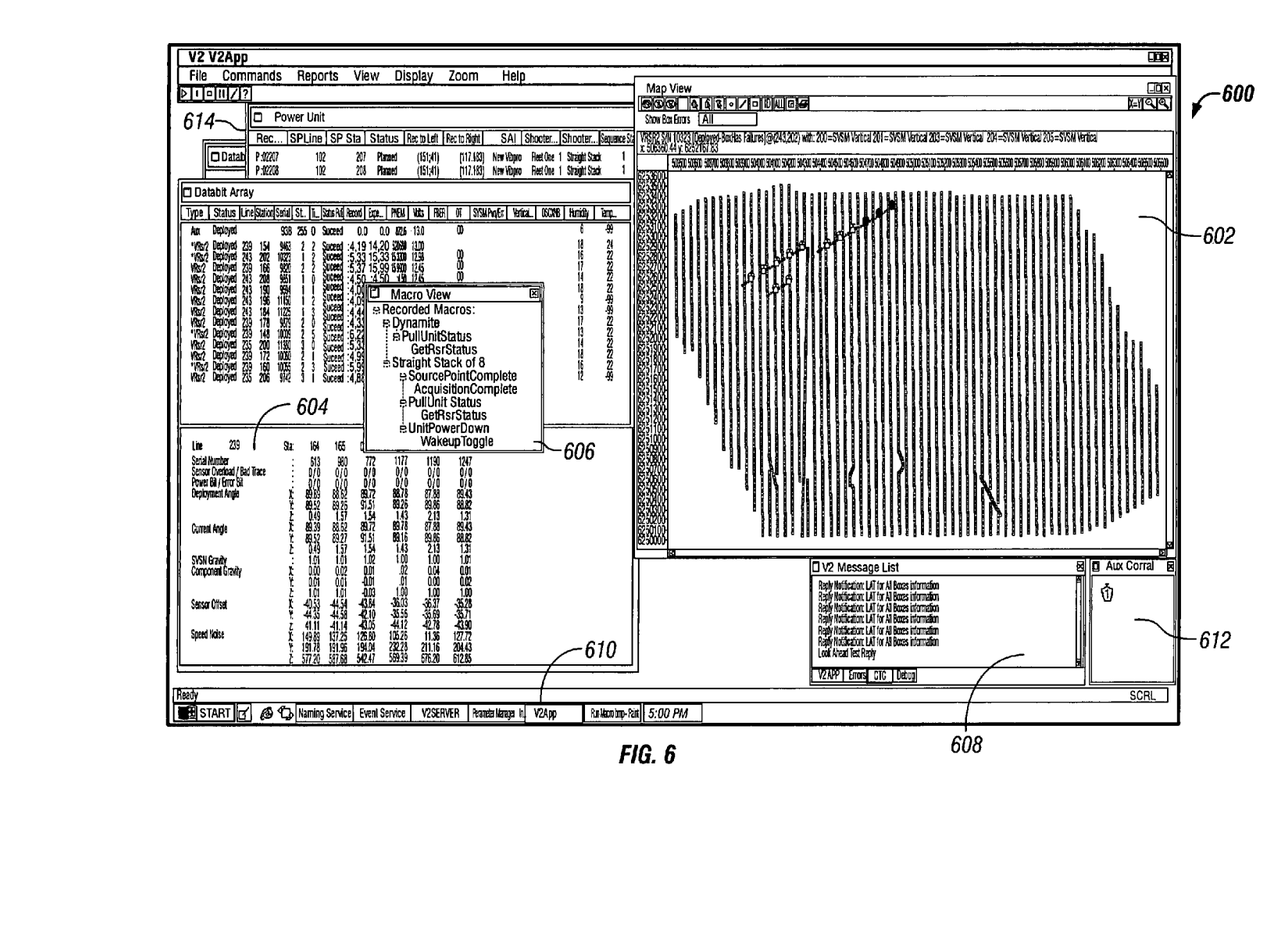
FIG. 6 is a user interface screen sample according to one embodiment of the present invention.

A sample workstation output available to the user is shown in FIG. 6. Shown is a display screen view 600 of a spread 602. The spread is represented graphically using symbols such as described above and shown in FIG. 2. In a preferred embodiment, a color code is assigned to each component, wherein a color provides an indication as to state and health of a particular component or group of components. For example, a failed component might be represented by the symbol colored in red, while a properly functioning component might be blue. Degraded performance, i.e. not failed but operating in less than a fully functioning state, might be represented by a third color easily distinguishable from the others. The color code is determined in part by the parameters set by the vendor and/or by parameters entered or modified by the user in the field.

In another embodiment, a group of components may indicate an overall state by a similar color-coded output display. Alternatively, the group and/or any given component state may be displayed in a non-color coded format, e.g. flashing symbols, X-out symbols, missing symbols etc.

A simultaneously displayed screen 604 provides numerical data and text relating to each component shown in the graphic display 602. A user may select a particular component from either screen using a mouse or keyboard stroke. The respective screens are then updated according to the input selection. For example, the user can highlight a component or group of components on the graphic screen 602 and the software updates the data screen 604 to show the data relevant to the selected component(s). Thus the user can immediately understand the health and actual status of each component in the field and make effective operational decisions accordingly.

In a preferred embodiment, the system will automatically issue commands to the field units if all parameters meet predetermined or user-input values. Thus the user only needs to intervene when there is a problem associated with a component or group of components effecting the efficiency and/or productivity to an unacceptable extent.

Also provided via the display 600 are other useful data window 614, 608, and 612. These windows display information such as a list of all sources in the system (i.e. not just in the viewed spread), shot locations, receiver lists, etc. Thus, the user has available any information necessary for the operation. However, the user is provided filtered output views, so only currently relevant data need be addressed at any particular time. This reduces the potential for operator error, and increases efficiency and productivity by eliminating the need to manipulate parameters not relevant e.g. the operator selects a vibrator truck and no dynamite parameters are shown. Each screen includes an associated macro program 606 according to the present invention to perform the filtering and selection tasks.

In another embodiment, the there exists a substantially similar workstation 300 in the seismic source vehicle 110. The second workstation would preferably provide a source vehicle operator the same information as displayed to the operator at the central controller 102. A display screen 600 is also provided to the source operator. Communication between the source operator and the central controller operator are accomplished via the two-way communication link 122 described above. This dual-control and two-way communication provides added capability in the field to understand and plan ahead for determining the most efficient action based on all available information.

Figure 7:
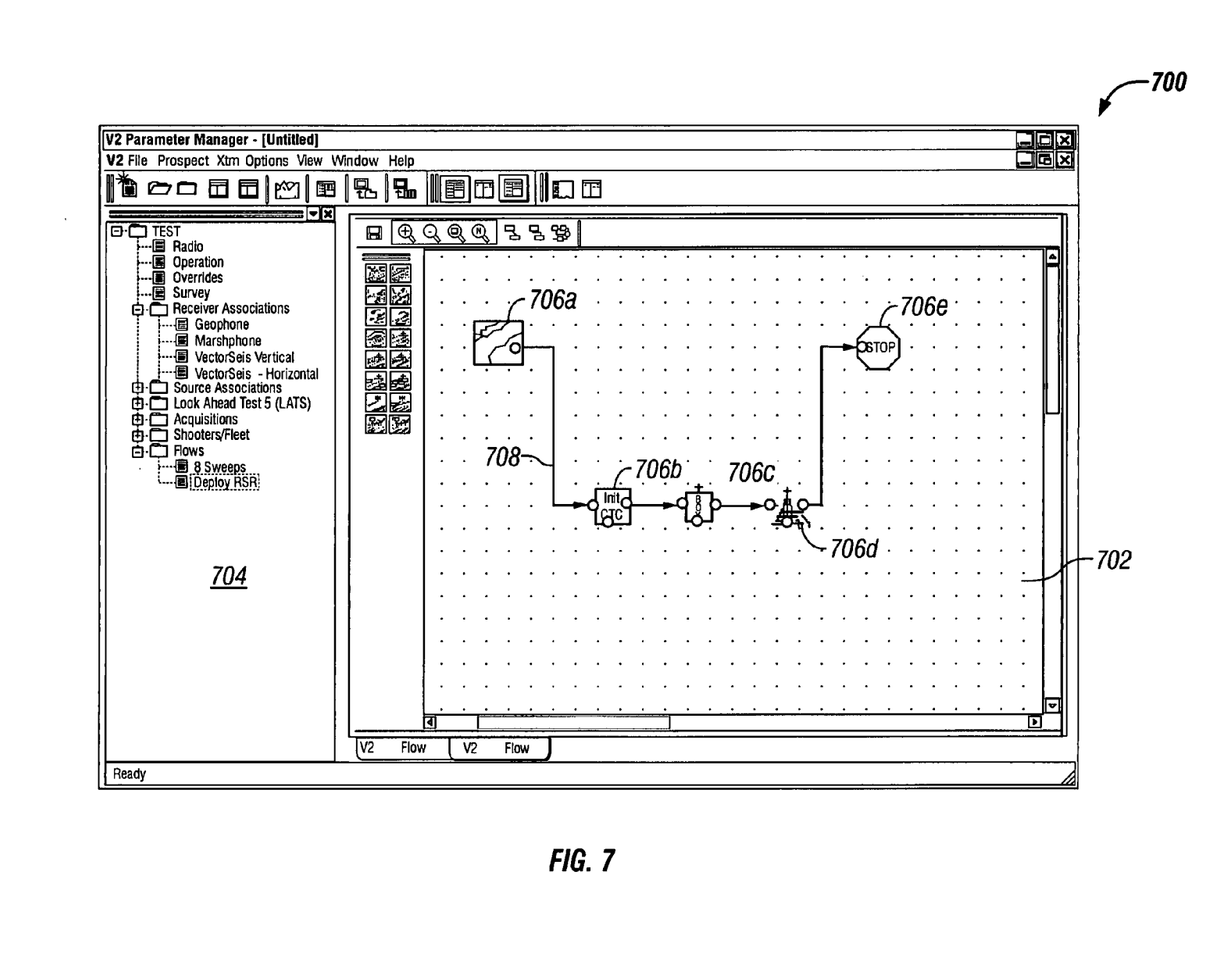
FIG. 7 is a workflow display according to the present invention.

FIG. 7 shows a method embodiment of the present invention used to control a seismic data acquisition workflow. A workflow, as used herein, means a group of tasks carried out by a seismic data acquisition such as the system described above and shown in FIG. 1 or by any component comprising the system.

Those skilled in the art would understand that the process of collecting seismic data includes many repetitive tasks, and that each task may include many steps. A workflow method according to the present invention allows the organizing of these steps and tasks into an ordered sequence of events.

The embodiment includes using a workstation in the central controller 102 substantially identical to the workstation 300 described above and shown on FIG. 3. The workstation 300 includes one or more user interface routines to allow the user to create, adjust and otherwise manipulate a workflow used in the seismic data acquisition operation. In FIG. 7, a flow 702 is displayed to a user as a group of tasks represented by a variety of icons, text, or other display format. The display 700 is preferably a window display on a computer monitor. In a preferred embodiment, the display 700 includes a group of icons 706a-e. A flow indicative indicator such as an arrow 708 connects each icon. Any particular flow or flows may be selected using a menu 704.

According to the present invention, the user manipulates a workflow according to real-time need or according to a particular seismic system configuration to increase overall system efficiency.

Each flow task 706a-e includes one or more parameters associated with the action required. The software is configured to allow dynamic input meaning that different actions may be taken according to survey demands. The workflow 702 may include branch decision points and repeated actions. These cases could be represented in any number of ways, and are preferably represented as icons and connectors as described above. The workflow 702 can be combined into larger workflows. Workflows may be pre-defined or constructed by the operator/user. Execution of a workflow will cause the system to take all actions to accomplish the desired task, and execution comprises a user input such as a mouse click or the like.

A workflow according to the present invention thus provides a graphical display and input system to allow a user to select from any number of useful seismic data acquisition tasks. These tasks are otherwise known in the art, while the present invention is directed to the organization, display, manipulation and execution of the tasks. The method includes parameters setting; dynamic selection of elements; roll of a selected source point; roll of a selected box; roll of selected status group; roll of a selected source/receiver line; workflow selection; workflow progress display and workflow delay. The term "roll" as applied to parameters described herein means to view or select substantially similar characteristics of the next item or group. For example, rolling a selected box means to select a subsequent box based on the parameters used to select a prior box. Likewise, to roll a workflow means to apply a workflow to subsequently selected components in the system.

Workflow delay is accomplished by inserting a software delay at a desired point in the workflow 702. A workflow progress display might be shown graphically as a change in color along the displayed workflow 702. Parameter setting and selection of roll and elements is accomplished using a display screen substantially as described below and shown in FIG. 6.

Workflows may be complicated in nature. To facilitate the construction of the workflow the graphical representation 702 is similar to a flow chart, which allows the operator to customize the actions taken during the workflow. Each step of a workflow corresponds to a graphical object and an associated graphical user interface (GUI), which allows setting of the parameters used to accomplish the step. Connecting lines indicate progression between steps. Additional workflow elements not shown in FIG. 7 include branches and loops. The connecting elements also have associated parameters.

Using such a GUI and the methods of the present invention provides commands, steps and instructions to be displayed as a toolbox of assorted capabilities. The toolbox concept is much like a toolbox used in many commercial computer applications, but is adapted according to the present invention to provide seismic data acquisition capabilities. Tools provided, therefore, include parameter implementation, connectors, loops, branches, and routine tools or subroutine macros for workflow validation. For example, a user might use the workflow program to construct a complex workflow. Rather than implementing the workflow real-time, the user can validate the workflow using software to determine whether the flow will work properly. Once a validated workflow is available, the user can then implement the flow in the field from the workstation. This method avoids the costly result of issuing shot commands and data acquisition commands and receiving corrupt or no data in return. Thus, efficiency and productivity are increased.

Tasks taken during seismic acquisition need to proceed as quickly as possible. Queuing desired tasks reduces delays between tasks. A manager for workflows facilitates the orchestration of these tasks. The workflow manager allows the operator to accomplish such tasks as monitoring the progress of the current flow, observe the pending flows, insert a flow, remove a flow, reorder the flows, cancel the execution of the current flow, and flush the queue of flows.

Figures 8, 9A, 9B, 9C:
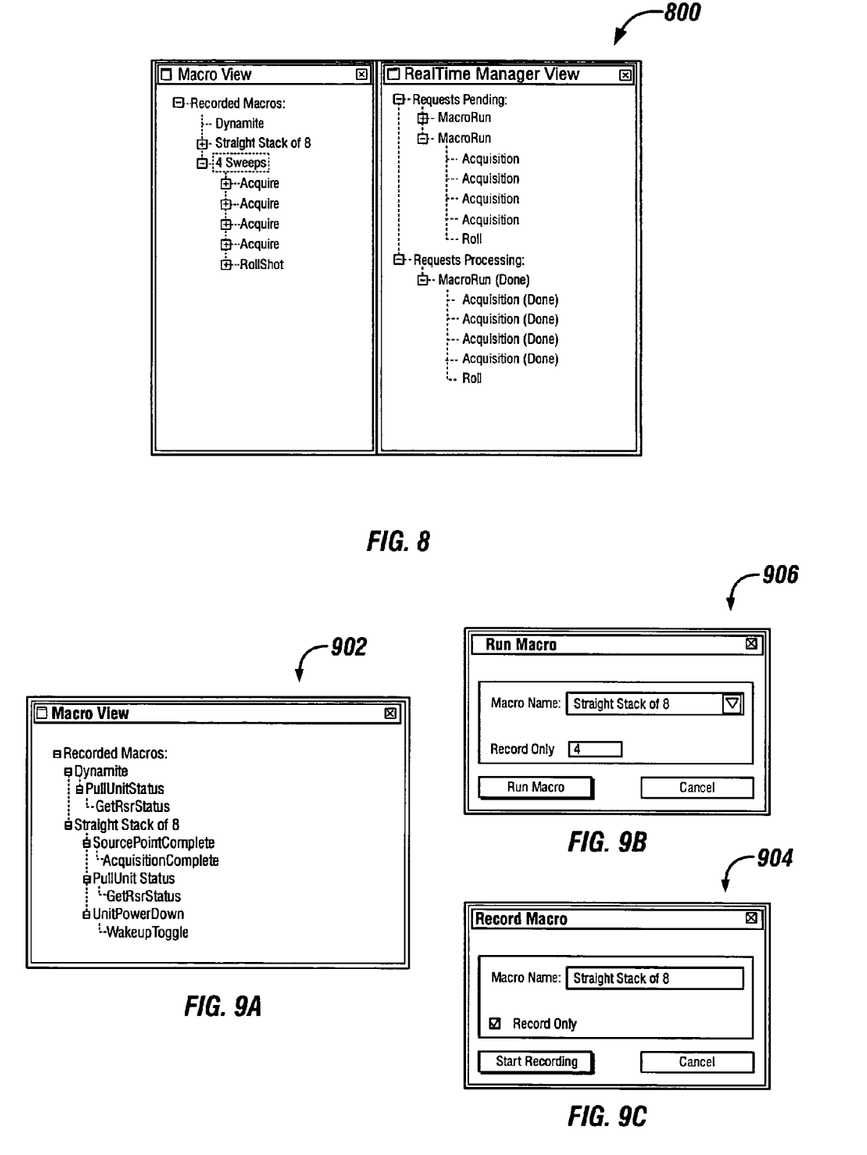
FIG. 8 shows a display window 800 including any number of preloaded macros.
FIGS. 9A-9C show various screens available to an operator, and used according to the present invention to select, create, adjust and run workflows as macro subroutines.

FIGS. 8 and 9A-9C show various screens available to an operator, and used according to the present invention to select, create, adjust and run workflows as macro subroutines. FIG. 8 shows a display window 800 including any number of preloaded macros 802. Each macro provides the operator a quick source of commands for controlling, monitoring and managing a large seismic spread. Any macro 802 can be selected, adjusted, deleted or run from either the central controller workstation or from a similar workstation in a source vehicle in the field.

In one embodiment, workflows are constructed by selecting a macro 902 from a list of available macros. Alternatively, a macro can be recorded 904 by recording the steps taken by the operator during a first set a flow creation steps. The operator uses a workstation computer as described above to enter steps and to record and run the macro created. The operator indicates that a macro should begin and assigns a name to the macro. Flow commands issued by the operator are added to the macro as a new step. Special macro commands, such as a programmed delay, or selection roll allow the modification of the macro behavior. A stop macro recording would conclude the construction of the macro. The operator runs 906 the macro in the same manner as a workflow. Thus, a macro is created for the purposes of the present invention by recording commands as the operator initially performs the commands. The macro can then be executed thereafter without the operator's physical input.

This macro-based method provides an alternative method of creating, manipulating and executing a workflow. Each macro preferably includes; a macro name, macro record/stop commands, a pause recording command, a macro view command, and subroutines and commands for editing and deleting steps.

In another embodiment of the present invention, an asynchronous state machine and method are provided. Seismic acquisition tasks cause the system to change states as the tasks progress.

The present invention provides an apparatus and method for collecting these state changes into a single element that allows the system to perform several tasks in parallel. To achieve this operation, each asynchronous state machine carries parameters in the form of executable instructions in a computer program required to perform the task and the expected state transitions. When a state transition occurs, the machine issues the commands required to move the system to the next state. Error conditions are managed as state transitions. This approach encapsulates autonomous operations and allows construction of workflows as described above.

A sample workstation output available to the user is shown in FIG. 6. Shown is a display screen view 600 of a spread 602. The spread is represented graphically using symbols such as described above and shown in FIG. 2. In a preferred embodiment, a color code is assigned to each component, wherein a color provides an indication as to state and health of a particular component or group of components. For example, a failed component might be represented by the symbol colored in red, while a properly functioning component might be blue. Degraded performance, i.e. not failed but operating in less than a fully functioning state, might be represented by a third color easily distinguishable from the others. The color code is determined in part by the parameters set by the vendor and/or by parameters entered or modified by the user in the field.

In another embodiment, a group of components may indicate an overall state by a similar color-coded output display. Alternatively, the group and/or any given component state may be displayed in a non-color coded format, e.g. flashing symbols, X-out symbols, missing symbols etc.

A simultaneously displayed screen 604 provides numerical data and text relating to each component shown in the graphic display 602. A user may select a particular component from either screen using a mouse or keyboard stroke. The respective screens are then updated according to the input selection. For example, the user can highlight a component or group of components on the graphic screen 602 and the software updates the data screen 604 to show the data relevant to the selected component(s). Thus the user can immediately understand the health and actual status of each component in the field and make effective operational decisions accordingly.

In a preferred embodiment, the system will automatically issue commands to the field units if all parameters meet predetermined or user-input values. Thus the user only needs to intervene when there is a problem associated with a component or group of components effecting the efficiency and/or productivity to an unacceptable extent.

Also provided via the display 600 are other useful data window 614, 608, and 612. These windows display information such as a list of all sources in the system (i.e. not just in the viewed spread), shot locations, receiver lists, etc. Thus, the user has available any information necessary for the operation. However, the user is provided filtered output views, so only currently relevant data need be addressed at any particular time. This reduces the potential for operator error, and increases efficiency and productivity by eliminating the need to manipulate parameters not relevant e.g. the operator selects a vibrator truck and no dynamite parameters are shown. Each screen includes an associated macro program 606 according to the present invention to perform the filtering and selection tasks.

Another embodiment can be explained using the system and methods described above and shown in FIGS. 1-9 without additional illustration. Acquisition of seismic data uses distributed ground electronics, e.g. a field unit such as a sensor, DAU, receiver, source etc. Initial communication with a unit is a process known as deployment. Deployment requires transfer of information such as the address of the unit to be used while the unit is active at a given location. A copious amount of input information is used during the deployment. And collection and processing of the information can be problematic. As such, the present invention provides an automated system and method of collecting and processing the information relating to any or all field units. Automatic deployment such as this reduces both the operator's effort and the probability of error. The benefits of using computer-controlled deployment are especially relevant when using repeaters to communicate with radio units.

The central controller 102 includes a database for tracking field unit frequencies. Each field unit may include a serial number for serial number based communication, i.e. unique addressing and commanding. A location for a field unit such as a sensor, or source is preferably assigned based on map-type coordinate information. Additional programs are provided for automated status group selection and automated repeater selection.

Seismic acquisition operates in three domains: ground electronic unit, seismic source, and sensor domain. The present invention alternatively uses the sensor domain to track equipment readiness. Understanding equipment readiness allows quick identification of equipment available for immediate use and for dispatching crews to repair detected problems. Sensor domain operation facilitates use of receiver-based detectors. Threshold level assignment to specific conditions allows receiver QC. Assignment of failure levels allows specification of a single receiver QC level. Uniform QC levels provides overall determination of equipment readiness.

The central controller programs are preferably adapted to present a graphical user interface including an output indicative of sensor domain operations. The output includes map interaction at receiver/sensor station level as described above and shown in FIGS. 2 and 6. Using an input device and the GUI, the controller is used to assign recording elements by receiver station. The central controller preferably provides lists and reports organized by receivers. The lists and reports preferably include historical shot information, present shot information, and information relating to planned shots. Quality control levels are preferably based on receiver position. And the central controller programs and GUI preferably present the user a spread-wide measurement of readiness based at least in part on the QC levels, historical information and spread receiver locations.

Seismic acquisition systems require hundreds of parameters. Associating parameter subsets using a name facilitates use of the subset. Minor differences between sets of parameters can be identified by name. After use of a named parameter set to acquire archived data, the values of the parameters in a name set can be locked from changing. The locking feature helps prevents accidental use of incorrect parameters and allows the operator to move between different operation modes by choosing a small number of named items.

Communication with remote units that have built in processors, such as the source processor 110a or a DAU 106a, allows the remote unit to summarize the state of the unit. This information can be returned and displayed. The system can use this in a summary mode to present the health of the system. Remote units can also summarize the collected data and return the summary value for display. The method of communicating between applications is based on a header and content system. This mode of packaging and communicating information provides a data structure adaptable to various programming methods. Parameter errors will return to the parameter application and the system will highlight the errors and suggest corrective action.

The foregoing description is directed to particular embodiments of the present invention for the purpose of illustration and explanation. It will be apparent, however, to one skilled in the art that many modifications and changes to the embodiment set forth above are possible without departing from the scope of the invention. It is intended that the following claims be interpreted to embrace all such modifications and changes.

What is claimed is:

1. A method of conducting a seismic survey using a survey plan, a plurality of sources imparting seismic energy into an underground formation, a plurality of seismic sensors detecting seismic energy, and a controller being programmed with a quality threshold, the controller being in communication with the plurality of sources and the plurality of seismic sensors, the method comprising:

Programming the controller with a plurality of characteristics relating to the plurality of sources, each of the plurality of characteristics having an effect on the survey plan;

Programming the controller with instructions to determine the effect of using a source from the plurality of sources on the survey plan and to determine whether the effect meets the quality threshold;

selecting at least one characteristic from the plurality of characteristics using a selection device associated with the controller; and Selecting a source to be activated by using the controller to determine which source from the plurality of sources if activated meets the quality threshold and the effect of using the source to be activated on the seismic plan; and conducting the seismic survey using the selected source and outputting the selected characteristic on a display device.

2. The method of claim 1, wherein the at least one characteristic includes at least one of source location, existence of a source, source state, source type, source availability, and source grade.

3. The method of claim 1, wherein the survey plan includes one or more of survey equipment configurations, survey spreads, planned source paths, and alternate source paths.

4. The method of claim 1, wherein selecting at least one characteristic further comprises determining a telemetry node state, and the effect relates to at least one of i) One or more sensors;

ii) Data integration; and iii) Path selection.

5. The method of claim 1 further comprising determining one or more receiver characteristics relating to the at least one selected seismic source characteristic.

6. The method of claim 5, wherein said one or more receiver characteristics include a receiver state and a receiver source template.

7. The method of claim 5 further comprising adjusting a quality level for the selected sources and the associated receivers.

8. The method of claim 7 selecting another source when the quality level indicates a failure condition.

9. The method of claim 8 further comprising assigning a percentage value to a source parameter, and wherein a returned value less than the percentage value is indicative of a quality control failure.

10. The method of claim 1 further comprising selecting one or more receivers associated with the selected seismic source and assessing a condition of each receiver of the one or more receivers based at least in part on using the selected source.

11. The method of claim 10 further comprising sorting the one or more selected receivers based at least in part on an overall state and providing automatic source activation for sources in the plurality of sources that have an overall state meeting a predetermined criterion.

12. The method of claim 1 further comprising selecting a source location within a survey area.

13. The method of claim 12 further comprising determining source locations occupied by seismic sources in the plurality of sources.

14. The method of claim 12 further comprising determining a source from the plurality of sources that is closest to the selected source location.

15. The method of claim 1 further comprising determining an actual location of a source in the plurality of sources and determining a planned source location closest to the actual source location.

16. The method of claim 1, further comprising issuing an activation command to the selected seismic source.

17. The method of claim 16 further comprising receiving a signal from said selected seismic source, said signal indicative of a quality level of the acoustic energy imparted into the earth by the selected source.

18. The method of claim 17 further comprising updating the survey plan based at least in part on said received signal.

19. The method of claim 1 further comprising providing an output from the controller that is indicative of one or more of (I) Shot history information;

(ii) Present shot information; and (iii) Information relating to future shots.

* * * * *